(12) United States Patent
Talbert

(10) Patent No.: US 11,657,014 B2
(45) Date of Patent: May 23, 2023

(54) SIGNAL BRIDGING USING AN UNPOPULATED PROCESSOR INTERCONNECT

(71) Applicant: ADVANCED MICRO DEVICES, INC., Santa Clara, CA (US)

(72) Inventor: Jason R. Talbert, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 15 days.

(21) Appl. No.: 17/115,384

(22) Filed: Dec. 8, 2020

(65) Prior Publication Data
US 2022/0179817 A1 Jun. 9, 2022

(51) Int. Cl.
*G06F 13/40* (2006.01)
*G06F 13/20* (2006.01)
*G06F 9/4401* (2018.01)

(52) U.S. Cl.
CPC .......... *G06F 13/4027* (2013.01); *G06F 13/20* (2013.01); *G06F 9/4405* (2013.01); *G06F 2213/40* (2013.01)

(58) Field of Classification Search
CPC .. G06F 13/4027; G06F 13/4022; G06F 13/20; G06F 13/385; G06F 9/4405; G06F 2213/40; G06F 2213/4002; G06F 2213/4004
See application file for complete search history.

(56) References Cited

U.S. PATENT DOCUMENTS

| | | | |
|---|---|---|---|
| 6,998,870 B1 | 2/2006 | Gulick et al. | |
| 7,596,650 B1* | 9/2009 | Aditya | G06F 13/4004 710/301 |
| 8,001,310 B2* | 8/2011 | Wheeler | G06F 13/4072 709/253 |
| 8,681,510 B2* | 3/2014 | Hu | H01R 12/57 361/764 |
| 10,360,167 B1* | 7/2019 | Butcher | G06F 13/4282 |
| 11,334,512 B1* | 5/2022 | Tripathy | G06F 13/4027 |
| 2004/0268000 A1 | 12/2004 | Barker et al. | |
| 2006/0080484 A1 | 4/2006 | Lefebvre et al. | |
| 2006/0129732 A1 | 6/2006 | Tsai et al. | |
| 2010/0058044 A1 | 3/2010 | Housty et al. | |
| 2012/0102308 A1* | 4/2012 | Hsu | G06F 9/4405 713/2 |
| 2013/0151813 A1* | 6/2013 | Pang | G06F 9/4405 712/E9.002 |
| 2021/0081214 A1* | 3/2021 | Lambert | G06F 9/4411 |

OTHER PUBLICATIONS

International Search Report and Written Opinion, PCT/US2021/062435, dated Mar. 22, 2022, 9 pages.

* cited by examiner

*Primary Examiner* — Raymond N Phan

(57) ABSTRACT

Signal bridging using an unpopulated processor interconnect, including: communicatively coupling an apparatus to a plurality of first signal paths between a bootstrap processor (BSP) and a processor interconnect of a circuit board; communicatively coupling the apparatus to a plurality of second signal paths between the processor interconnect and a peripheral interface of the circuit board; and communicatively coupling the BSP to the peripheral interface via one or more third signal paths in the apparatus.

20 Claims, 6 Drawing Sheets

SIGNAL BRIDGING USING AN UNPOPULATED PROCESSOR INTERCONNECT

BACKGROUND

In systems capable of supporting multiple processors, some system configurations include unpopulated processor interfaces. When a processor interface such as a socket is unpopulated, an application processor is not installed in the processor interface. This reduces the capabilities of the system to access peripheral interfaces or other components of a motherboard that would otherwise be coupled to an installed application processor.

DETAILED DESCRIPTION

Figure 1:
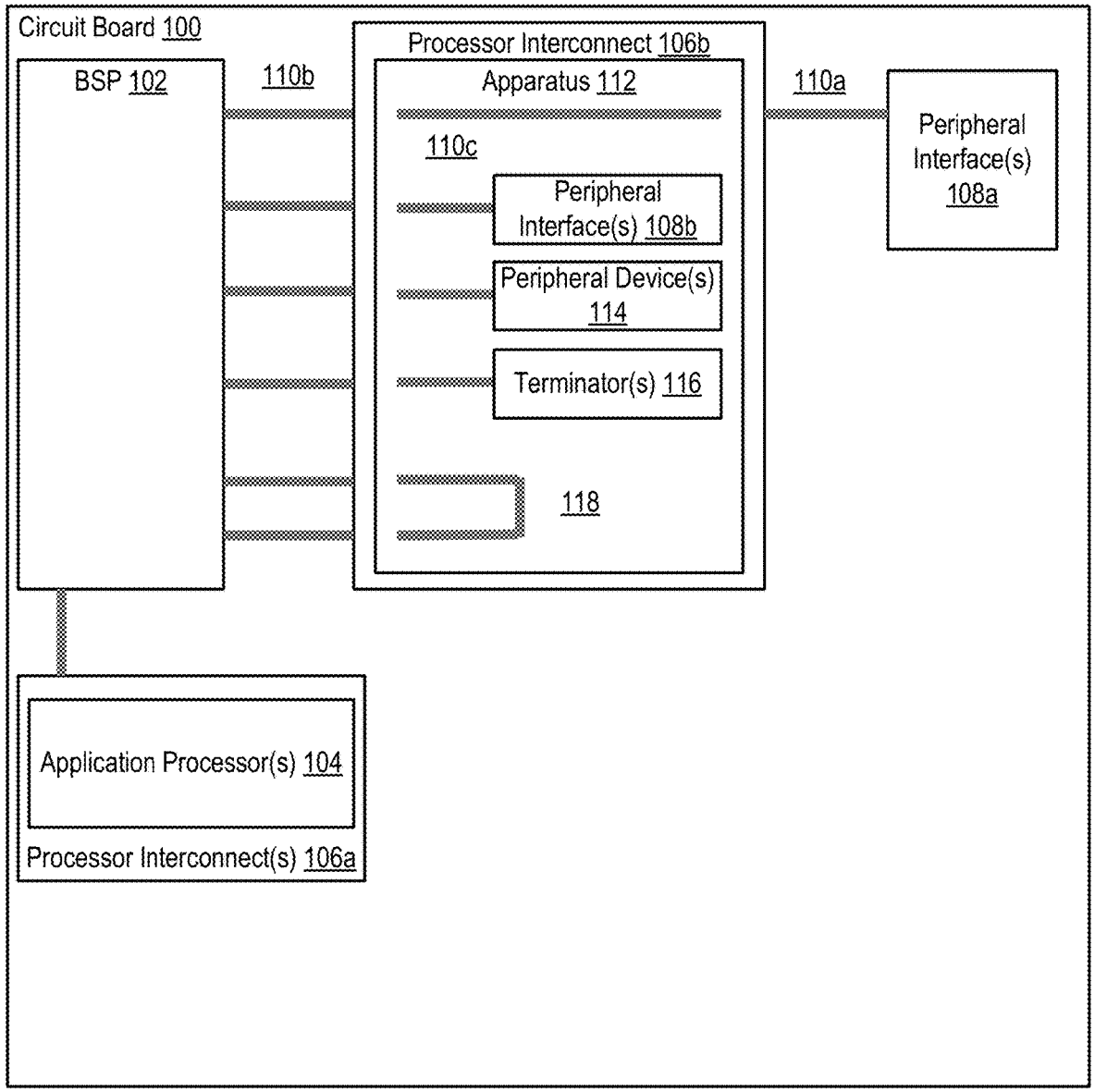
FIG. 1 is a block diagram of an example circuit board for signal bridging using an unpopulated processor interconnect according to some embodiments.

In some embodiments, a method of signal bridging using an unpopulated processor interconnect includes communicatively coupling an apparatus to a plurality of first signal paths between a bootstrap processor (BSP) and a processor interconnect of a circuit board; communicatively coupling the apparatus to a plurality of second signal paths between the processor interconnect and a peripheral interface of the circuit board; and communicatively coupling the BSP to the peripheral interface via one or more third signal paths in the apparatus.

In some embodiments, the apparatus includes a printed circuit board and the one or more third signal paths each include a conductive trace. In some embodiments, the apparatus communicatively couples the BSP to the peripheral interface when installed in the processor interconnect of the circuit board. In some embodiments, the apparatus includes one or more other peripheral interfaces, and the method further includes communicatively coupling the one or more other peripheral interfaces to the BSP via one or more fourth signal paths in the apparatus. In some embodiments, the apparatus includes one or more embedded peripheral devices, and the method further includes communicatively coupling the one or more embedded peripheral devices interfaces to the BSP via one or more fourth signal paths in the apparatus. In some embodiments, the method further includes terminating, via one or more signal terminators of the apparatus, one or more of the first signal paths. In some embodiments, the method further includes communicatively coupling, via one or more loopback connections of the apparatus, two or more of the first signal paths.

In some embodiments, an apparatus for signal bridging using an unpopulated processor interconnect, performs steps including: communicatively coupling the apparatus to a plurality of first signal paths between a bootstrap processor (BSP) and a processor interconnect of a circuit board; communicatively coupling the apparatus to a plurality of second signal paths between the processor interconnect and a peripheral interface of the circuit board; and communicatively coupling the BSP to the peripheral interface via one or more third signal paths in the apparatus.

In some embodiments, the apparatus includes a printed circuit board and the one or more third signal paths each includes a conductive trace. In some embodiments, the apparatus communicatively couples the BSP to the peripheral interface when installed in the processor interconnect of the circuit board. In some embodiments, the apparatus further includes one or more other peripheral interfaces; and one or more fourth signal paths communicatively coupling the one or more other peripheral interfaces to the BSP. In some embodiments, the apparatus further includes one or more embedded peripheral devices; and one or more fourth signal paths configured to communicatively coupling the one or more embedded peripheral devices to the BSP. In some embodiments, the apparatus further includes one or more signal terminators terminating one or more of the first signal paths. In some embodiments, the apparatus further includes one or more loopback connections configured to couple two or more of the first signal paths.

In some embodiments, a circuit board for signal bridging using an unpopulated processor interconnect includes: a bootstrap processor; a peripheral interface; a processor interconnect; and an apparatus installed in the processor interconnect, the apparatus performing steps including: communicatively coupling the apparatus to a plurality of first signal paths between a bootstrap processor (BSP) and a processor interconnect of a circuit board; communicatively coupling the apparatus to a plurality of second signal paths between the processor interconnect and a peripheral interface of the circuit board; and communicatively coupling the BSP to the peripheral interface via one or more third signal paths in the apparatus.

In some embodiments, the apparatus includes a printed circuit board and the one or more third signal paths each includes a conductive trace. In some embodiments, the apparatus communicatively couples the BSP to the peripheral interface when installed in the processor interconnect of the circuit board. In some embodiments, the apparatus further includes one or more other peripheral interfaces; and one or more fourth signal paths communicatively coupling the one or more other peripheral interfaces to the BSP. In some embodiments, the apparatus further includes one or more embedded peripheral devices; and one or more fourth signal paths configured to communicatively coupling the one or more embedded peripheral devices to the BSP. In some embodiments, the apparatus further includes one or more signal terminators terminating one or more of the first signal paths. In some embodiments, the apparatus further includes one or more loopback connections configured to couple two or more of the first signal paths.

In some multiprocessor systems, a motherboard includes multiple processor interconnects into which application processors can be installed. Examples of such interconnects include processor slots or sockets that form mechanical and electrical connections between an installed application processor and the motherboard. Depending on the configuration of the system, some processor interconnects do not have an installed application processor. Such processor interconnects are considered "unpopulated." For example, a customer wishes to only include two application processors on a motherboard capable of supporting up to four application processors to save costs.

Where the motherboard includes peripheral interfaces (e.g., Input/Output (I/O) connections or interfaces for peripheral devices), some motherboards include direct connections between the peripheral interface and a processor interconnect. This allows for an installed peripheral device to communicate with an installed application processor. Where the processor interconnect coupled to the peripheral interface is unpopulated (e.g., without an installed application processor), the system is unable to fully utilize any peripheral devices coupled to the peripheral interface. For example, the peripheral interface is unusable, or a peripheral device processes data at rates slower than if the peripheral interface were populated with an application processor.

Signal bridging using an unpopulated processor interconnect addresses the performance hinderances caused by an unpopulated processor interconnect. FIG. 1 is a block diagram of a non-limiting example circuit board 100 for signal bridging using an unpopulated processor interconnect. The example circuit board 100 can be implemented in a variety of computing devices, including servers, network devices, mobile devices, personal computers, peripheral hardware components, gaming devices, set-top boxes, and the like. On some embodiments, the circuit board 100 is a motherboard into which the principal components of a computing system are installed, including processors, memory, peripheral components, and the like. As an example, the circuit board 100 includes a printed circuit board (PCB) including conductive traces facilitating the communication between components coupled to the circuit board 100.

The example circuit board 100 includes a bootstrap processor (BSP) 102. The BSP 102 is a processor designated for executing the initial processes for starting a multiprocessor computing system. For example, when a multiprocessor system starts by first receiving power, the BSP 102 loads and executes boot code from a predefined memory address. The BSP 102 then executes the boot code, initializes other memory (e.g., Dynamic Random Access Memory (DRAM)), performs other boot operations in addition to initializing the application processors 104. The application processors 104 are processors tasked with running processes beyond the initial boot process handled by the BSP 102. For example, the application processors 104 will perform operations relating running an operating system, software, interacting with peripheral devices, and the like. Both the BSP 102 and application processors 104 include single-core processors, multi-core processors, or other processors as can be appreciated.

The circuit board 100 also includes a plurality of processor interconnects 106a, 106b. The processor interconnects 106a,b are components that provide mechanical and electrical connections between an installed processor (e.g., application processors 104) and the circuit board 100. For example, electrical connections are formed between connection points of the application processor 104, such as pins, pads, or bumps, and connection points of the processor interconnect 106a,b, such as conductive pads, surfaces, or pin holes. Mechanical connections are formed between the application processor 104a,b and the circuit board 100 using latches, clips, or other mechanical interlocks. The processor interconnects 106b allow for application processors 104 to be installed in a circuit board 100. Where the processor interconnects 106b provide for installation of a processor 104 without the need for soldering, this provides the ability to add and remove application processors 104 from the circuit board 100 as desired or dictated by design considerations. It is understood that, in some embodiments, the processor interconnects 106a,b include interconnects that require an installed processor or apparatus (described below) to be installed using solder. In this example circuit board 100, one or more application processors 104 are installed in one or more processor interconnects 106a, while the processor interconnect 106b has no installed application processor 104. In other words, the processor interconnect 106b is unpopulated.

The circuit board 100 also includes one or more peripheral interfaces 108a. The peripheral interfaces 108a are Input/Output connections, ports, slots, etc. into which a peripheral device installed, thereby providing additional functionality for a system including the circuit board 100. Such peripheral interfaces 108a allow for a variety of system configurations and functionality using interchangeable peripheral devices. The peripheral interfaces 108a also allow cabling or interconnection to other circuit boards, or other components of a system. As an example, the peripheral interfaces 108a include peripheral component interconnect express (PCIe) slots, Serial AT Attachment (SATA) ports, Universal Serial Bus (USB) ports, and the like. Example peripheral devices capable of being installed in a peripheral interface 108a include graphics processing units (GPUs), network interface cards (NICs), storage controllers, and the like.

The peripheral interfaces 108a are communicatively coupled to the processor interconnect 106b using one or more signal paths 110a. The signal paths 110a are paths of a conductive material allowing for signal transfer between the processor interconnect 106b and the peripheral interfaces 108a. For example, the signal paths 110a include conductive traces of copper or another conductive material in a dielectric material composing the circuit board 100 (e.g., polyamide, or another dielectric material suitable for PCBs). As another example, the signal paths 110a include buses, wires, or other conductive pathways for signals between the peripheral interfaces 108a and the processor interconnect 106b. Where an application processor 104 is installed in the processor interconnect 106b, the installed processor 104 would be able to communicate with a peripheral device installed in a peripheral interface 108a via the signal paths 110a.

As is set forth above, the processor interconnect 106b is unpopulated. For example, a user configuring a system including the circuit board 100 chooses to not purchase another application processor 104 for installation in the processor interconnect 106b as a cost saving measure. As the processor interconnect 106b is unpopulated, an application processor 104 cannot interact with the peripheral interface 108ab, limiting or eliminating the capabilities of any peripheral device inserted into the peripheral interface 108a.

Instead, an apparatus 112 is inserted into the processor interconnect 106b. In some embodiments, the apparatus 112 includes a printed circuit board of a dielectric material (e.g., polyamide). The apparatus 112 includes connection points to the processor interconnect 106b to allow for an electrical coupling to the circuit board 100. The particular type of connection points in the apparatus 112 corresponds to the connection mechanisms used by an application processor 104 were it to be inserted in the processor interconnect 106b. In other words, the apparatus 112 duplicates the electrical connection mechanisms between an application processor 104 and the processor interconnect 106b. For example, where the processor interconnect 106b includes holes for pins of an application processor 104, the apparatus 112 includes pins as connection points. Where the processor interconnect 106b forms a connection with an application processor 104 using conductive pads or bumps, the apparatus 112 includes the appropriate pads or bumps.

The circuit board 100 also includes signal paths 110b between the processor interconnect 106b and the BSP 102. In some embodiments, the signal paths 110b include conductive traces in the circuit board 100, buses, wires, or other conductive pathways as can be appreciated. The signal paths 110b are communicatively coupled to Input/Output areas of the BSP 102, allowing the BSP 102 to provide output or receive input via the signal paths 110b. Were an application processor 104 installed in the processor interconnect 106b, the installed application processor 104 would be able to communicate with the BSP 102 via these signal paths 110b. Instead, when the apparatus 112 is installed in the processor interconnect 106b, the connection points of the apparatus 112 form communicative coupling to the signal paths 110a (between the processor interconnect 106b and the peripheral interfaces 108a) and communicative coupling to the signal paths 110b (between the processor interconnect 106b and the BSP 102).

The apparatus 112 also includes signal paths 110c. For example, where the apparatus 112 is a printed circuit board, the signal paths 110c include conductive traces (e.g., copper traces) in the PCB. One or more of the signal paths 110c bridge or conductively couple connection points of the apparatus 112 that connect the apparatus 112 to the processor interconnect 106b. When the apparatus 112 is installed in the processor interconnect 106b, the signal path 110c serves to bridge a signal path 110a (between the processor interconnect 106b and the peripheral interfaces 108a) to a signal paths 110b (between the processor interconnect 106b and the BSP 102). Thus, the apparatus 112 conductively couples a peripheral interface 108a to the BSP 102 by bridging signal paths 110a and 110b.

By coupling a peripheral interface 108a to the BSP 102, peripheral devices installed in the peripheral interface 108a may communicate with the BSP 102 via the apparatus 112. An installed peripheral device is then able to use the BSP 102 in place of the uninstalled application processor 104 to assist peripheral device operations. Thus, the performance loss caused by an unpopulated processor interconnect 106b is reduced or eliminated.

In some embodiments, the apparatus 112 is composed of passive components. For example, in some embodiments, the apparatus 112 is composed of a PCB, signal paths 110c, and the connection points to the processor interconnect 106b. In other embodiments, the apparatus 112 includes active components (e.g., components providing functionality other than physical structure or signal conductivity), such as buffers, multiplexers, signal conditioners, and discrete logic. In some embodiments, the apparatus 112 provides additional functionality beyond bridging signal paths between a BSP 102 and peripheral interface 108a. For example, in some embodiments, the apparatus 112 itself includes additional peripheral interfaces 108b. For example, the apparatus 112 includes additional PCIe slots, SATA connections, and the like to expand the number of peripheral interfaces 108a,b available on the circuit board 100, or to interconnect with (e.g., via cabling) additional interfaces or devices. Such peripheral interfaces 108b are communicatively coupled via a signal path 110c to the processor interconnect 106b, thereby forming a signal path from the BSP 102 to the peripheral interfaces 108b via signal paths 110b and 110c.

In some embodiments, the apparatus 112 includes embedded peripheral devices 114. An embedded peripheral device 114 is a peripheral device whose functional components are included in or components of the apparatus 112, without the use of an intermediary peripheral interface 108a,b. For example, the apparatus 112 includes one or more embedded GPUs, NICs, storage devices, or other embedded devices as can be appreciated, further expanding the functionality available to the circuit board 100. Such embedded peripheral devices 114 are communicatively coupled via a signal path 110c to the processor interconnect 106b, thereby forming a signal path from the BSP 102 to the embedded peripheral devices 114 via signal paths 110b and 110c.

In some embodiments, the apparatus 112 includes terminators 116. The terminators 116 terminate a signal from the BSP 102. For example, the terminators 116 match a characteristic impedance of a signal path 110b to prevent signal reflection, distortion, or other signal characteristics. For example, assume that the BSP 102 provides output signals to the processor interconnect 106b via signal paths 110b. Further assume that these output signals need not be bridged to a peripheral interface 108a or provided to another component. These signals are instead carried to a terminator 116. In some embodiments, the terminators 116 include passive terminators, such as a resistor. In other embodiments, the terminators 116 include active terminators such as voltage regulators. Such voltage regulators control the voltage applied to the resister, thereby affecting the resistance applied to the signal from the BSP 102.

In some embodiments, the apparatus 112 includes loopback connections 118. Loopback connections 118 are signal pathways in the apparatus 112 that conductively couple two signal paths 110b. Thus, an output signal from the BSP 102 via a first signal path 110b is received as an input signal by the BSP 102 via a second signal path 110b.

In some embodiments, the use of terminators 116, loopback connections 118, and combinations thereof in the apparatus 112 are dependent on the BSP 102 or processor interconnect 106b used in conjunction with the apparatus 112. For example, certain models of BSP 102 will function incorrectly if certain output signals are not terminated. As another example, certain models of BSP 102 will function incorrectly if certain output signals are not looped back as input signals. Accordingly, one skilled in the art would appreciate that the particular configuration of terminators 116, loopback connections 118, and combinations thereof will vary depending on the design considerations of the corresponding BSP 102 or processor interconnect 106b.

The BSP 102 of the circuit board 100 will potentially communicate with a variety of peripheral devices (either as peripheral devices installed in peripheral interfaces 108a,b or as embedded peripheral devices 114), in some embodiments, the BSP 102 is configurable to use any of multiple signaling protocols (e.g., SATA, PCIe, Ethernet, and the like) depending on the particular device(s) communicating with the BSP 102. In some embodiments, configuring the BSP 102 to use a particular signaling protocol includes configuring the BSP 102 via a Unified Extensible Firmware Interface (UEFI) or Basic Input/Output System (BIOS). For example, a particular UEFI or BIOS configuration attribute devices a particular signaling protocol to be used by the BSP 102. On system boot, the UEFI or BIOS configure the BSP 102 to use the particular signaling protocol. Accordingly, the particular signaling protocol to be used is changed by reconfiguring the UEFI or BIOS.

In another embodiment, the apparatus 112 includes code or data stored in memory that is read by the BSP 102. The BSP 102 configures itself to communicate using a particular protocol indicated in the stored code or data. In a further embodiment, the particular signaling protocol to be used by the BSP 102 is dependent on a particular configuration of terminators 116, loopback connections 118, or combinations thereof. Thus, reconfiguring an arrangement of terminators 116, loopback connections 118, or combinations thereof changes the particular signaling protocol to be used by the BSP 102.

As described above, the apparatus 112 allows for a BSP 102 to be accessed by a peripheral device in place of an uninstalled application processor 104. This mitigates some or all performance and function loss associated with an unpopulated processor interconnect 106b. As the apparatus 112 is composed of less expensive materials than an application processor 104 (e.g., a printed circuit board versus a complex silicon chip), the regained functionality is achieved with minimal cost compared to installing another application processor 104. Moreover, where the apparatus 112 includes additional peripheral interfaces 108b or peripheral devices 114, the apparatus 112 provides for additional peripheral device functionality that would not be available were the processor interconnect 106b populated with an application processor 104.

One skilled in the art will appreciate that the configuration of the circuit board 100 is merely exemplary, and that other configurations are possible. For example, although not shown in the example circuit board 100, one skilled in the art will appreciate that, in some embodiments, the circuit board 100 includes additional components. Such additional components include, for example, additional processor interconnects populated with application processors 104, unpopulated processor interconnects, processor interconnects populated with additional apparatuses 112, or other interconnects as can be appreciated. In some embodiments, such additional components include additional peripheral interfaces 108a, peripheral devices 114, terminators 116, or other components as can be appreciated.

Figure 2:
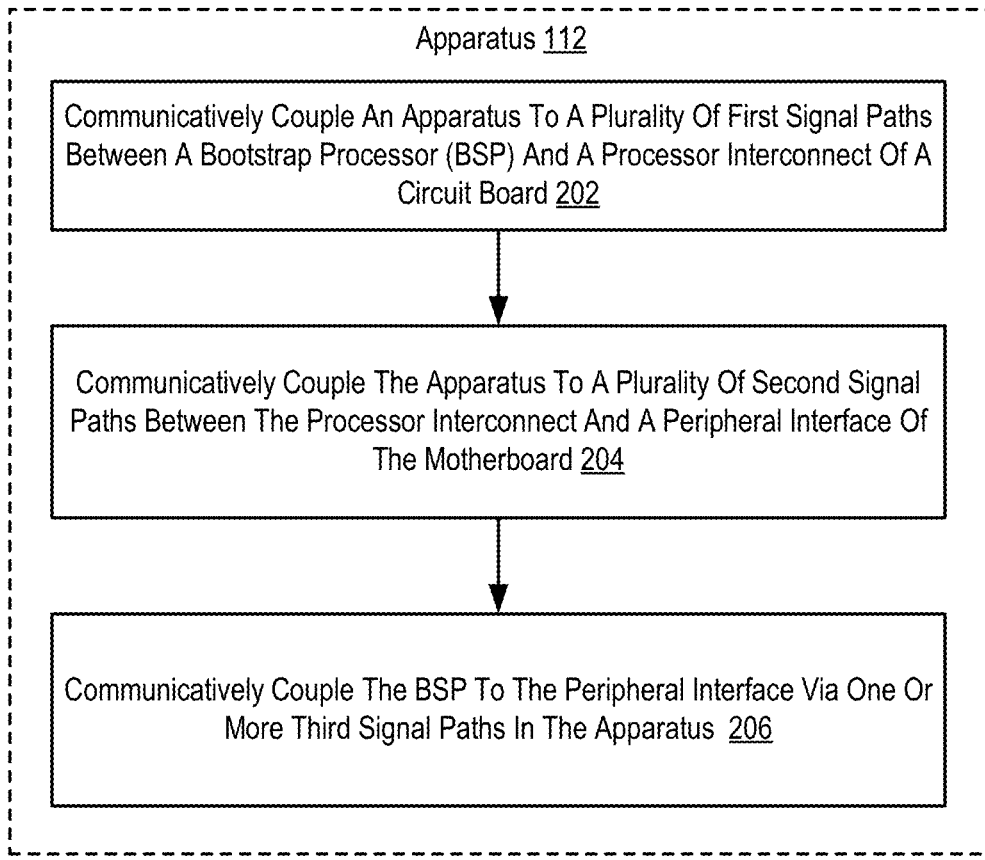
FIG. 2 is a flowchart of an example method for signal bridging using an unpopulated processor interconnect according to some embodiments.

For further explanation, FIG. 2 sets forth a flow chart illustrating an exemplary method for signal bridging using an unpopulated processor interconnect that includes communicatively coupling 202 an apparatus 112 to a plurality of first signal paths 110b between a bootstrap processor (BSP) 102 and a processor interconnect 106b of a circuit board 100. In some embodiments, the circuit board 100 includes a printed circuit board (PCB) and the plurality of first signal paths 110b include conductive traces in the circuit board 100. For example, the first signal paths 110b include conductive traces of copper or another conductive material etched or traced in a dielectric material such as polyamide. The conductive traces provide a conductive pathway for signal transfer between the BSP 102 and the processor interconnect 106b. As another example, the first signal paths 110b include buses, wires, or other conductive paths as can be appreciated. The processor interconnect 106b includes, for example, a processor socket or processor socket. In some embodiments, the circuit board 100 is a motherboard in a multiprocessor computing system. Accordingly, in some embodiments, the processor interconnect 106b is one of a plurality of processor interconnects 106a,b. In some embodiments, one or more application processors 104 are installed in processor interconnects 106a while the processor interconnect 106b does not have an application processor 104 installed. In other words, the processor interconnect 106b is unpopulated.

Communicatively coupling 202 the apparatus 112 to the plurality of first signal paths 110b includes installing the apparatus 112 in the processor interconnect 106b. Installing the apparatus 112 in the processor interconnect 106b includes forming mechanical and electrical couplings between the apparatus 112 and the circuit board 100 via the processor interconnect 106b. For example, clips, clamps, or other mechanical interconnects of the processor interconnect 106b mechanically couple the apparatus 112 to the circuit board 100, thereby preventing removal of the apparatus 112 from the processor interconnect 106b and maintaining and electrical couplings.

In some embodiments, the apparatus 112 include a printed circuit board (PCB) to provide structure for housing one or more connection points to the processor interconnect 106b, as well as additional components to be described in further detail below. The apparatus 112 is electrically coupled to the circuit board 100 using the one or more connection points. The particular type of connection points in the apparatus 112 correspond to the connection mechanisms used by an application processor 104 were it to be inserted in the processor interconnect 106b. In other words, the apparatus 112 duplicates the electrical connection mechanisms between an application processor 104 and the processor interconnect 106b. For example, where the processor interconnect 106b includes holes for pins of an application processor 104, the apparatus 112 includes pins as connection points. Where the processor interconnect 106b forms a connection with an application processor 104 using conductive pads or bumps, the apparatus 112 includes the appropriate pads or bumps. Accordingly, the apparatus 112 is communicatively coupled 202 to the plurality of first signal paths 110b by coupling the connection points of the apparatus 112 to the processor interconnect 106b, with the processor interconnect 106b being communicatively coupled 202 to the first signal paths 110b. The signal paths 110b are communicatively coupled to Input/Output areas of the BSP 102, allowing the BSP 102 to provide output or receive input via the signal paths 110b. Thus, a plurality of signal paths between the BSP 102 and the apparatus 112 are formed.

The method of FIG. 2 also includes communicatively coupling 204 the apparatus to a plurality of second signal paths 110a between the processor interconnect 106b and a peripheral interface 108a of the circuit board 100. Peripheral interfaces 108a are Input/Output connections, ports, slots, etc. into which a peripheral device installed, thereby providing additional functionality for a system including the circuit board 100. As an example, the peripheral interfaces 108a include peripheral component interconnect express (PCIe) slots, Serial AT Attachment (SATA) ports, Universal Serial Bus (USB) ports, and the like. Example peripheral devices capable of being installed in a peripheral interface 108a include graphics processing units (GPUs), network interface cards (NICs), storage controllers, and the like.

The peripheral interfaces 108a are communicatively coupled to the processor interconnect 106b using the one or more second signal paths 110a. The second signal paths 110a are paths of a conductive material allowing for signal transfer between the processor interconnect 106b and the peripheral interfaces 108a. For example, the second signal paths 110a include buses, wires, conductive traces, or other conductive pathways for signals between the peripheral interfaces 108a and the processor interconnect 106b. Where an application processor 104 is installed in the processor interconnect 106b, the installed processor 104 would be able to communicate with a peripheral device installed in a peripheral interface 108a via the second signal paths 110a. The apparatus 112 is communicatively coupled 104 to the plurality of second signal paths 110a by coupling the connection points of the apparatus 112 to the processor interconnect 106b, with the processor interconnect 106b being communicatively coupled 204 to the second signal paths 110a. Thus, a plurality of signal paths between the peripheral interface 108a and the apparatus 112 are formed.

Communicatively coupling 204 the apparatus 112 to the plurality of second signal paths 110a includes installing the apparatus 112 in the processor interconnect 106b by forming mechanical and electrical couplings between the apparatus 112 and the circuit board 100 via the processor interconnect 106b. Accordingly, in some embodiments, installing the apparatus 112 in the processor interconnect 106b serves to communicatively couple 202 the apparatus 112 to the plurality of first signal paths 110b and communicatively couple 204 the apparatus 112 to the plurality of second signal paths 110a.

The method of FIG. 2 also includes communicatively coupling 206 the BSP 102 to the peripheral interface 108a via one or more third signal paths 110c in the apparatus 112. For example, where the apparatus 112 is a printed circuit board, the third signal paths 110c include conductive traces (e.g., copper traces) in the PCB. One or more of the third signal paths 110c bridge or conductively couple connection points of the apparatus 112 that connect the apparatus 112 to the processor interconnect 106b. When the apparatus 112 is installed in the processor interconnect 106b, the third signal path 110c serves to bridge a signal path 110a (between the processor interconnect 106b and the peripheral interfaces 108a) to a signal paths 110b (between the processor interconnect 106b and the BSP 102). Thus, a signal path between the BSP 102 and the peripheral interface 108a is formed by bridging first signal paths 110a and second signal paths 110b in the circuit board 100 using a third signal path 110c in the apparatus 112.

By coupling a peripheral interface 108a to the BSP 102, peripheral devices installed in the peripheral interface 108a may communicate with the BSP 102 via the apparatus 112. An installed peripheral device is then able to use the BSP 102 in place of the uninstalled application processor 104 to assist peripheral device operations. Thus, the performance loss caused by an unpopulated processor interconnect 106b is reduced or eliminated.

Figure 3:
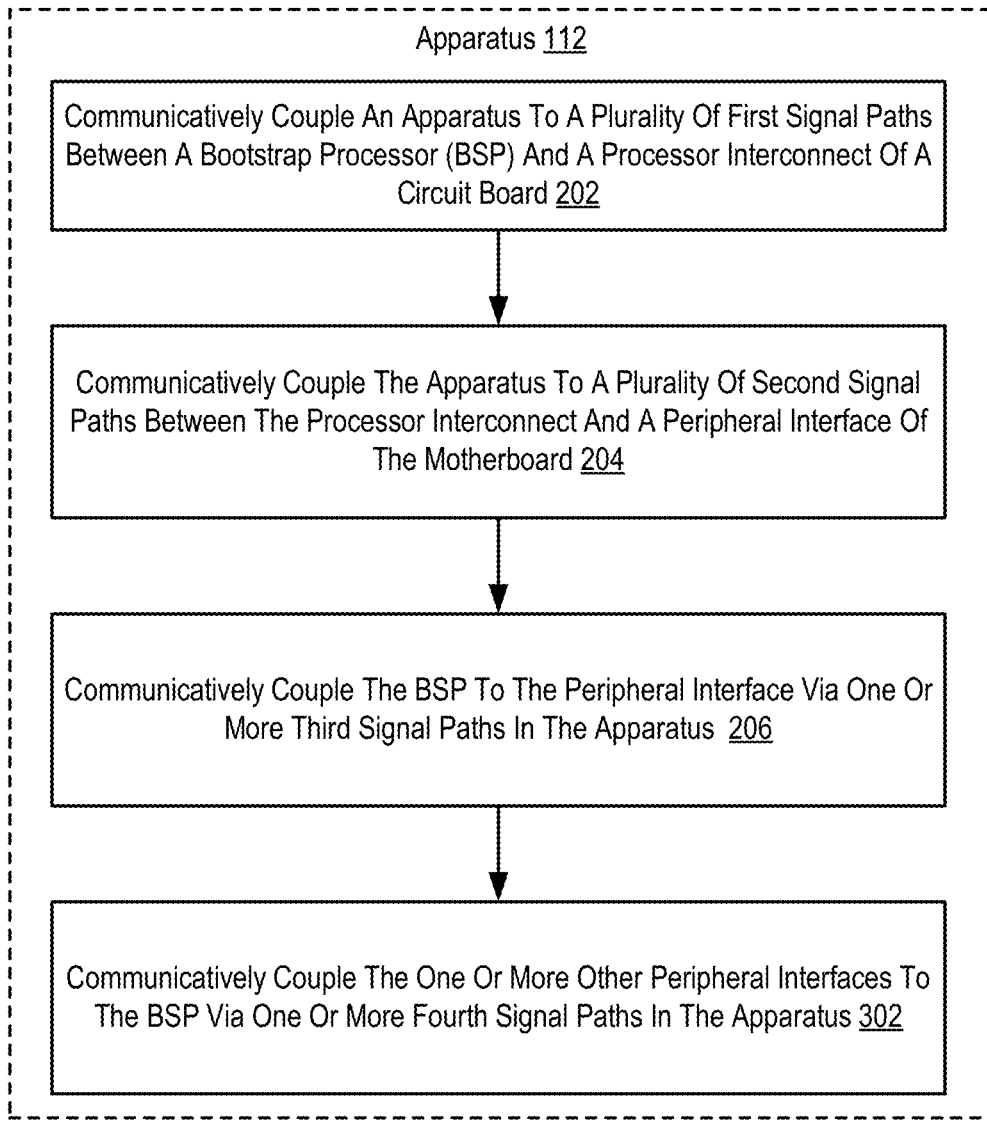
FIG. 3 is a flowchart of an example method for signal bridging using an unpopulated processor interconnect according to some embodiments.

For further explanation, FIG. 3 sets forth a flow chart illustrating an exemplary method for signal bridging using an unpopulated processor interconnect that includes communicatively coupling 202 an apparatus 112 to a plurality of first signal paths 110b between a bootstrap processor (BSP) 102 and a processor interconnect 106b of a circuit board 100; communicatively coupling 204 the apparatus to a plurality of second signal paths 110a between the processor interconnect 106b and a peripheral interface 108a of the circuit board 100; and communicatively coupling 206 the BSP 102 to the peripheral interface 108a via one or more third signal paths 110c in the apparatus 112.

The method of FIG. 3 differs from FIG. 2 in that the method of FIG. 3 includes communicatively coupling 302 one or more other peripheral interfaces 108b to the BSP 102 via one or more fourth signal paths in the apparatus 112. For example, the apparatus 112 includes one or more additional peripheral interfaces 108b, such as additional PCIe slots, SATA connections, and the like to expand the number of peripheral interfaces 108a,b available on the circuit board 100. Such peripheral interfaces 108b are communicatively coupled to the processor interconnect 106b via fourth signal paths. Such fourth signal paths are similar to third signal paths 110c in that the fourth signal paths include conductive traces, wires, buses, or other conductive paths in the apparatus 112. However, the fourth signal paths are coupled to a peripheral interface 108b on the apparatus 112, unlike the third signal paths 110c that are coupled to first signal paths 110a in the circuit board 100. The fourth signal paths serve to from a signal pathway from the BSP 102 to the peripheral interfaces 108b vis first signal paths 110b and the processor interconnect 106b. Thus, the apparatus 112 uses the unpopulated processor interconnect 106b to add additional peripheral interfaces 108b to the circuit board 100 that are communicatively coupled to the BSP 102.

Figure 4:
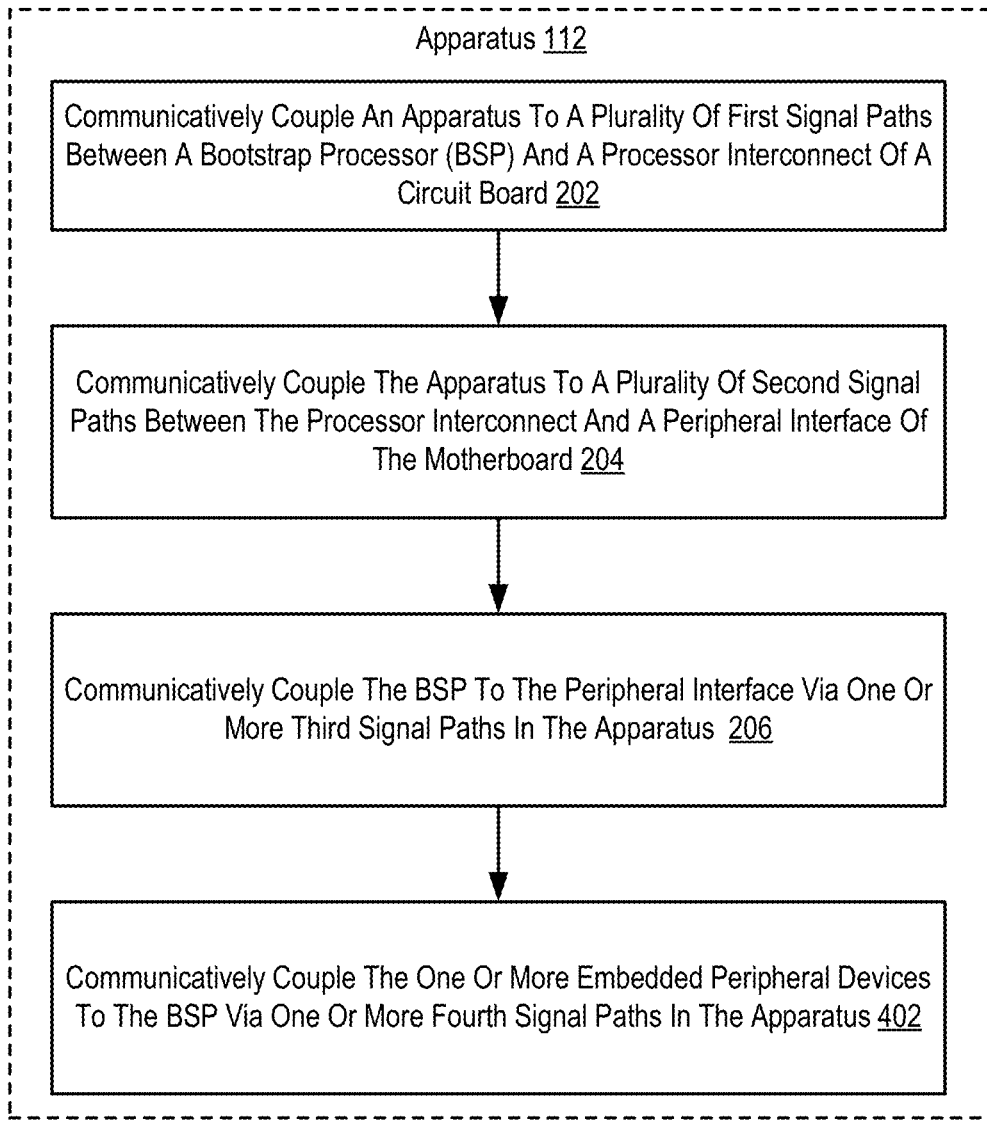
FIG. 4 is a flowchart of an example method for signal bridging using an unpopulated processor interconnect according to some embodiments.

For further explanation, FIG. 4 sets forth a flow chart illustrating an exemplary method for signal bridging using an unpopulated processor interconnect that includes communicatively coupling 202 an apparatus 112 to a plurality of first signal paths 110b between a bootstrap processor (BSP) 102 and a processor interconnect 106b of a circuit board 100; communicatively coupling 204 the apparatus to a plurality of second signal paths 110a between the processor interconnect 106b and a peripheral interface 108a of the circuit board 100; and communicatively coupling 206 the BSP 102 to the peripheral interface 108a via one or more third signal paths 110c in the apparatus 112.

The method of FIG. 4 differs from FIG. 2 in that the method of FIG. 4 includes communicatively coupling 402 one or more other embedded peripheral devices 114 to the BSP 102 via one or more fourth signal paths in the apparatus 112. An embedded peripheral device 114 is a peripheral device whose functional components are included in or components of the apparatus 112, without the use of an intermediary peripheral interface 108a,b. For example, the apparatus 112 includes one or more embedded GPUs, NICs, storage devices, or other embedded devices as can be appreciated, further expanding the functionality available to the circuit board 100. Thus, the apparatus 112 uses the unpopulated processor interconnect 106b to add additional peripheral devices 114 to the circuit board 100 that are communicatively coupled to the BSP 102.

Figure 5:
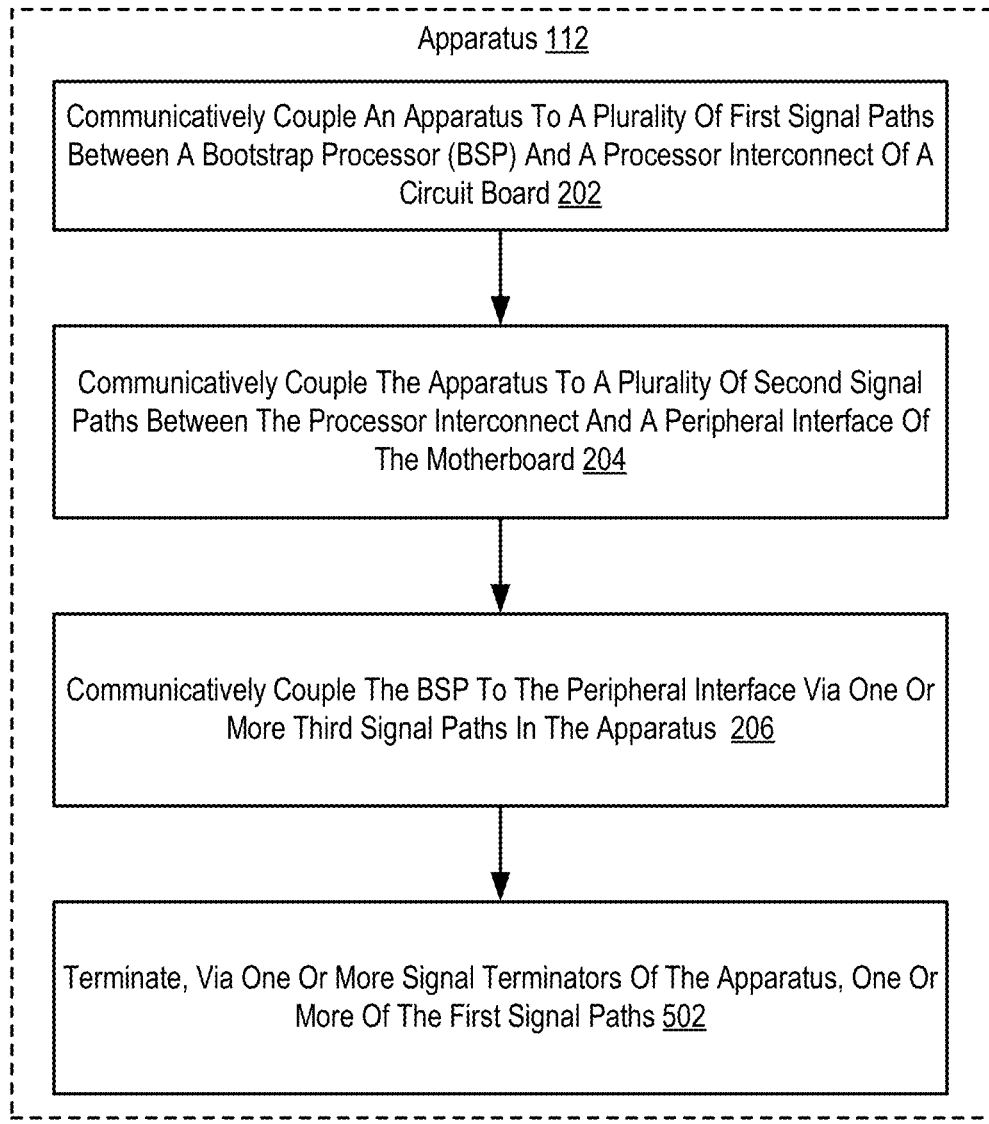
FIG. 5 is a flowchart of an example method for signal bridging using an unpopulated processor interconnect according to some embodiments.

For further explanation, FIG. 5 sets forth a flow chart illustrating an exemplary method for signal bridging using an unpopulated processor interconnect that includes communicatively coupling 202 an apparatus 112 to a plurality of first signal paths 110b between a bootstrap processor (BSP) 102 and a processor interconnect 106b of a circuit board 100; communicatively coupling 204 the apparatus to a plurality of second signal paths 110a between the processor interconnect 106b and a peripheral interface 108a of the circuit board 100; and communicatively coupling 206 the BSP 102 to the peripheral interface 108a via one or more third signal paths 110c in the apparatus 112.

The method of FIG. 5 differs from FIG. 2 in that the method of FIG. 5 includes terminating 502, via one or more signal terminators 116 of the apparatus 112, one or more of the first signal paths 110b. The terminators 116 terminate a signal from the BSP 102 carried via the first signal paths 110b to the processor interconnect 106b. For example, the terminators 116 match a characteristic impedance of a first signal path 110b to prevent signal reflection, distortion, or other signal characteristics. For example, assume that the BSP 102 provides output signals to the processor interconnect 106b via first signal paths 110b. Further assume that these output signals need not be bridged to a peripheral interface 108a or provided to another component. These signals are instead carried to a terminator 116. In some embodiments, the terminators 116 include passive terminators, such as a resistor. In other embodiments, the terminators 116 include active terminators such as voltage regulators. Such voltage regulators control the voltage applied to the resister, thereby affecting the resistance applied to the signal from the BSP 102.

Figure 6:
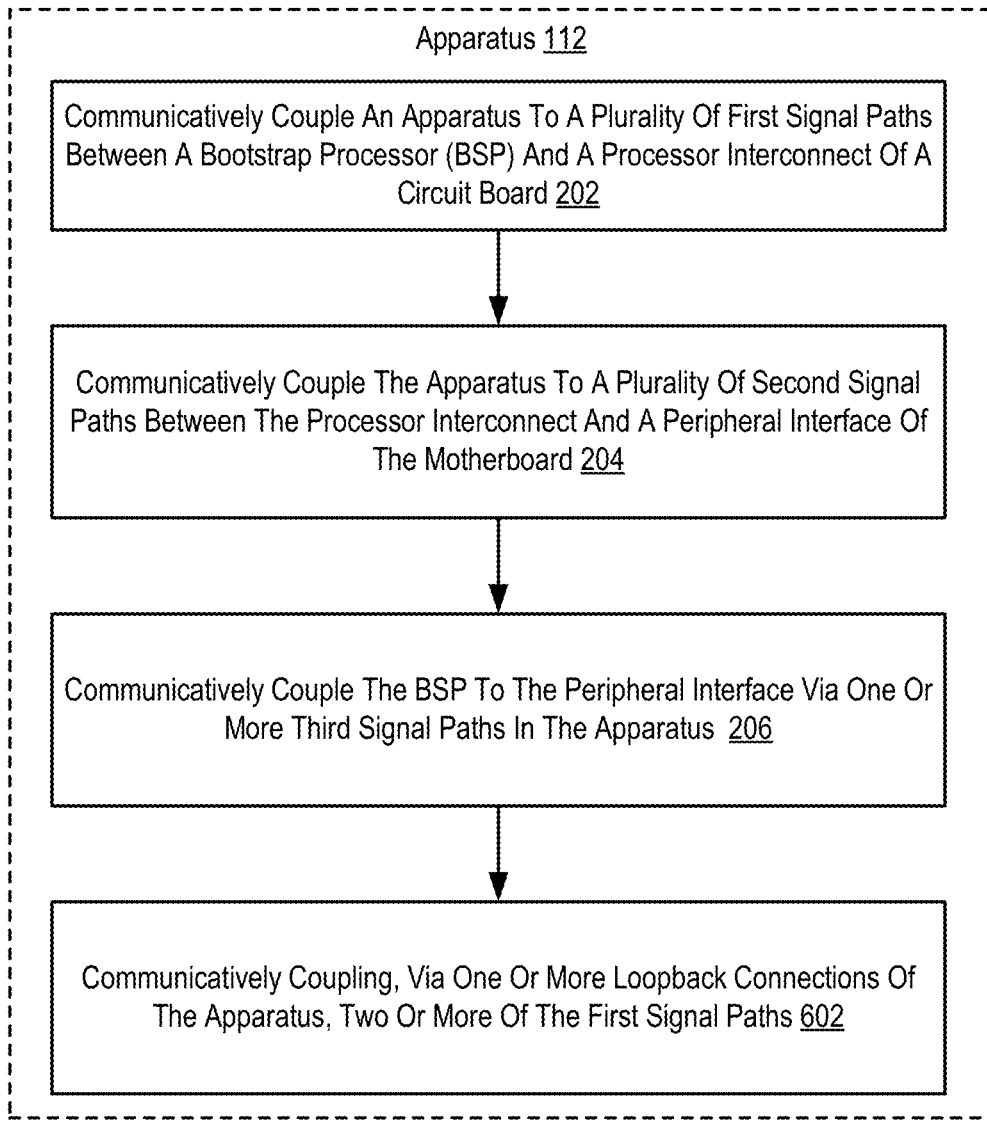
FIG. 6 is a flowchart of an example method for signal bridging using an unpopulated processor interconnect according to some embodiments.

For further explanation, FIG. 6 sets forth a flow chart illustrating an exemplary method for signal bridging using an unpopulated processor interconnect that includes communicatively coupling 202 an apparatus 112 to a plurality of first signal paths 110b between a bootstrap processor (BSP) 102 and a processor interconnect 106b of a circuit board 100; communicatively coupling 204 the apparatus to a plurality of second signal paths 110a between the processor interconnect 106b and a peripheral interface 108a of the circuit board 100; and communicatively coupling 206 the BSP 102 to the peripheral interface 108a via one or more third signal paths 110c in the apparatus 112.

The method of FIG. 6 differs from FIG. 2 in that the method of FIG. 6 includes communicatively coupling 602, via one or more loopback connections 118 of the apparatus 112, two or more for the first signal paths 110b. Loopback connections 118 are signal pathways in the apparatus 112 that conductively couple two signal paths 110b. Thus, an output signal from the BSP 102 via a first signal path 110b is received as an input signal by the BSP 102 via a second signal path 110b.

In some embodiments, the use of terminators 116 as described in FIG. 5, loopback connections 118, and combinations thereof in the apparatus 112 ensure proper functionality of a BSP 102 coupled to the apparatus 112. In some embodiments, the particular configurations of terminators 116, loopback connections 118, and are dependent on the BSP 102 or processor interconnect 106b used in conjunction with the apparatus 112. For example, certain models of BSP 102 will function incorrectly if certain output signals are not terminated. As another example, certain models of BSP 102 will function incorrectly if certain output signals are not looped back as input signals. Accordingly, one skilled in the art would appreciate that the particular configuration of terminators 116, loopback connections 118, and combinations thereof will vary depending on the design considerations of the corresponding BSP 102 or processor interconnect 106b.

In some embodiments, a particular signaling protocol to be used by the BSP 102 is dependent on a particular configuration of terminators 116, loopback connections 118, or combinations thereof. Thus, reconfiguring an arrangement of terminators 116, loopback connections 118, or combinations thereof changes the particular signaling protocol to be used by the BSP 102.

In view of the explanations set forth above, readers will recognize that the benefits of signal bridging using an unpopulated processor interconnect include:

Improved performance of a computing system by accessing the processing capabilities of a bootstrap processor where a processor interface is unpopulated by an application processor.

Improved performance of a computing system by allowing for the bootstrap processor to be used by peripheral interfaces by adding an apparatus to an unpopulated processor interface that is cheaper and simpler to manufacturer when compared to an application processor.

Improved performance of a computing system by expanding the number of peripheral devices or peripheral interfaces on a circuit board using an unpopulated processor interface.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method of signal bridging using a processor interconnect, the method comprising:
communicatively coupling an apparatus to a first signal path between a bootstrap processor (BSP) and a processor interconnect of a circuit board;
communicatively coupling the apparatus to a second signal path between the processor interconnect and a peripheral interface of the circuit board;
communicatively coupling the BSP to the peripheral interface via a third signal path in the apparatus; and
communicatively coupling one or more other peripheral interfaces in the apparatus to the BSP via a fourth signal path in the apparatus.

2. The method of claim 1, wherein the apparatus comprises a printed circuit board and the third signal path comprises a conductive trace.

3. The method of claim 1, wherein the apparatus is configured to communicatively couple the BSP to the peripheral interface when installed in the processor interconnect of the circuit board.

4. The method of claim 1, wherein the apparatus comprises one or more embedded peripheral devices, and the method further comprises communicatively coupling the one or more embedded peripheral devices to the BSP via a fifth signal path in the apparatus.

5. The method of claim 1, further comprising terminating, via a signal terminator of the apparatus, the first signal path.

6. The method of claim 1, wherein the first signal path includes a plurality of traces and the method further comprises communicatively coupling, via one or more loopback connections of the apparatus, two or more of the traces of the first signal path.

7. The method of claim 1, wherein the apparatus further comprises a memory storing data indicating a signaling protocol to be used by the BSP.

8. An apparatus for signal bridging using a processor interconnect, the apparatus comprising:
- connection points communicatively coupled to processor interconnect connection points of the processor interconnect;
- signal paths that communicatively couple a bootstrap processor (BSP) to a peripheral interface through the processor interconnect, the connection points, and the signal paths of the apparatus; and
- signal paths that communicatively couple one or more other peripheral interfaces in the apparatus to the BSP.

9. The apparatus of claim 8, wherein the apparatus comprises a printed circuit board and the signal paths each comprise a conductive trace.

10. The apparatus of claim 9, wherein the apparatus is configured to communicatively couple the BSP to the peripheral interface when installed in the processor interconnect of the printed circuit board.

11. The apparatus of claim 8, further comprising:
- one or more embedded peripheral devices; and
- a fifth signal path configured to communicatively couple the one or more embedded peripheral devices to the BSP.

12. The apparatus of claim 8, further comprising one or more signal terminators configured to terminate one or more of the signal paths.

13. The apparatus of claim 8, further comprising one or more loopback connections configured to couple two or more signal paths from the BSP.

14. The apparatus of claim 8, wherein the apparatus further comprises a memory storing data indicating a signaling protocol to be used by the BSP.

15. A circuit board for signal bridging using a processor interconnect, comprising:
- a bootstrap processor (BSP);
- a peripheral interface;
- a processor interconnect; and
- an apparatus comprising connection points communicatively coupled to processor interconnect connection points of the processor interconnect, wherein:
- the BSP is communicatively coupled to the processor interconnect through a first signal path,
- the peripheral interface is communicatively coupled to the processor interconnect through a second signal path;
- the BSP is communicatively coupled to the peripheral interface through the processor interface and a third signal path in the apparatus; and
- the BSP is communicatively coupled to one or more other peripheral interfaces in the apparatus through a fourth signal path in the apparatus.

16. The circuit board of claim 15, wherein the apparatus comprises a printed circuit board and the third signal path comprises a conductive trace.

17. The circuit board of claim 15, wherein the apparatus further comprises:
- one or more embedded peripheral devices; and
- a fifth signal path configured to communicatively couple the one or more embedded peripheral devices to the BSP.

18. The circuit board of claim 15, wherein the apparatus further comprises one or more signal terminators configured to terminate the first signal path.

19. The circuit board of claim 15, wherein the apparatus further comprises one or more loopback connections configured to couple two or more traces of the first signal path.

20. The circuit board of claim 15, wherein the apparatus further comprises a memory storing data indicating a signaling protocol to be used by the BSP.

* * * * *